United States Patent [19]

Rapier

[11] 4,346,560

[45] Aug. 31, 1982

[54] MULTI-STAGE FLASH DEGASER

[75] Inventor: Pascal M. Rapier, Richmond, Calif.

[73] Assignee: The United States of America as represented by the United States Department of Energy, Washington, D.C.

[21] Appl. No.: 163,369

[22] Filed: Jun. 26, 1980

[51] Int. Cl.³ .................................................. F03G 7/00
[52] U.S. Cl. .................................. 60/641.3; 60/641.5; 165/45
[58] Field of Search ................. 60/641.3, 641.5; 55/49, 55/50, 199, 200; 122/31 R; 165/45

[56] References Cited

U.S. PATENT DOCUMENTS

| | | | |
|---|---|---|---|
| 3,972,193 | 8/1976 | Sherwood | 165/45 X |
| 4,089,175 | 5/1978 | Woinsky | 60/641 |
| 4,132,075 | 1/1979 | Fleck | 60/641 |
| 4,138,851 | 2/1979 | Rogers | 60/641 |
| 4,144,755 | 3/1979 | Fleck | 60/641 |
| 4,152,898 | 5/1979 | Awerbuch | 60/641 |

OTHER PUBLICATIONS

Anker & Sims 1976–Geothermal Direct Contact Heat Exchanger; pp. 48–62, Final Report, Ben Holt Co., San/1116-1 for Energy R & D Adm., DGE Jun. 10, 1976.
Bechtel Corp. 1976 Conceptual Design of Commercial 50 MWe (Net) Geothermal Power Plants at Heber & Niland, California pp. II4-1–II15-10 Final Report SAN1124-1 for Energy R & D Adm., DGE Oct. 1976.

Primary Examiner—Alan Cohan
Attorney, Agent, or Firm—L. E. Carnahan; Roger S. Gaither; Richard G. Besha

[57] ABSTRACT

A multi-stage flash degaser (18) is incorporated in an energy conversion system (10) having a direct-contact, binary-fluid heat exchanger to remove essentially all of the noncondensable gases from geothermal brine ahead of the direct-contact binary-fluid heat exchanger (22) in order that the heat exchanger (22) and a turbine (48) and condenser (32) of the system (10) can operate at optimal efficiency.

25 Claims, 2 Drawing Figures

MULTI-STAGE FLASH DEGASER

The U.S. Government has rights in this invention pursuant to contract No. W-7405-ENG-48 between the U.S. Department of Energy and the University of California.

BACKGROUND OF THE INVENTION

The present invention relates to energy conversion systems, and in particular, to a degaser for removing noncondensable gases from an elevated temperature fluid preparatory to introducing the fluid into a heat exchanger.

In the above energy conversion system the heat exchanger can be a direct-contact, single or binary-fluid heat exchanger for transfering energy from the elevated temperature fluid, as for example brine from a geothermal well, to an immiscible working fluid, as for example, isobutane. The isobutane is vaporized in the heat exchanger and can be used to drive a turbine. The energy conversion system further include a condenser for condensing the working fluid preparatory to the fluid being reintroduced into the heat exchangers.

Noncondensable gases including carbon dioxide, can be dissolved in and carried with the geothermal brine. These gases, if not properly removed from the system, can degrade the performance of the heat exchanger in the following several ways.

First, total pressure of the gases leaving the heat exchanger and entering the turbine equals the summation of the partial pressures of vaporized isobutane, of any escaping brine vapor, and of the noncondensable gases. As the noncondensable gases in the geothermal brine usually vary in amount and composition, a turbine designed for an average amount and composition will usually be operating on a nonaverage amount and composition due to the fact that an average amount and composition may not exist, but merely be a mathematical midpoint. Accordingly, the turbine will usually be operating inefficiently. Further, due to the presence of the noncondensable gases, the turbine may be operating in a corrosive environment.

Second, the total pressure of gases in an unvented condenser, which condenses the isobutane or like hydrocarbon after the isobutane exits the turbine, builds up to an equilibrium value that depends on the rate at which the gases, including the noncondensables, entering the system can be removed by redissolving the same in the cool exiting brine. This buildup of gases at the condenser interferes with heat transfer and requires a much larger condenser. Venting the condenser, however, can be very costly in terms of equipment and the losses of the working fluid.

Third, the buildup of back pressure at the condenser badly degrades the performance of the turbine. In isentropic expansion, the work output of the turbine is roughly proportionaly to the logarithm of the pressure ratio. The back pressure sharply reduces this ratio with a consequent loss of power.

Fourth, the back pressure of the noncondensables interferes with a flashing process in the direct-contact, binary-fluid heat exchanger by which the geothermal brine actively transfers its heat to vaporize the isobutane. Consequently, for the same brine temperatures and for equivalent transfers of heat, higher total pressures and larger equipment are required.

Fifth, the presence of the noncondensables in the geothermal brine entering the heat exchanger encourages froth formation in the heat exchanger with a resultant lowering in thermal conductivity.

Sixth, as indicated above some of the gases are corrosive, and if allowed to enter the isobutane loop would require costly construction to prevent damage to the equipment.

Seventh, recovery of dissolved isobutane from the spent geothermal brine by boiling in vacuo and condensing is feasible provided that the geotheral brine is essentially free of noncondensable gases. Without this recovery of isobutane, however, the direct contact cycle is neither economically viable nor environmentally acceptable.

The prior art has attempted to deal with these problems in several ways. One approach is the venting off of some of the noncondensable gases at a well head separator or at a small vent tank directly ahead of the direct-contact, binary-fluid heat exchanger. These devices have proven hard to control and fail to remove all of the noncondensable gases and also result in a loss of steam from the geothermal brine.

A prior art device produced by the Ben Holt Company has been proposed as a means for saving the steam (see *Anker v. Sims* 1976—Geothermal Direct Contact Heat Exchanger—pp 48-62, Final Report, the Ben Holt Co., SAN/1116-1 for Energy Research & Development Adm., DGE June 10, 1976). In the Ben Holt system, part of the steam is used to preheat and boil a small side stream of the isobutane by means of a special heat exchanger necessarily consisting of an isobutane boiler section and a counter-current isobutane preheater and noncondensable gas subcooler section. The isobutane vapors resulting are directed to the turbine. The rest of the steam is used in another heat exchanger to preheat water for a plate-type scrubber for washing salty mist out of the isobutane vapor stream ahead of the turbine. Thus three separate pieces of equipment in addition to a vent tank or brine flash separator with much interacting piping, values, and controls are required.

In addition, the Ben Holt system is inefficient due to the pressure drop and temperature loss associated therewith. As for example, in the Ben Holt system a back pressure regulator or pressure reducing valve must be placed between the vent tank and the special heat exchanger. In operation, this regulator causes the steam to condense at a lower temperature than is required to boil the isobutane. Accordingly, the isobutane is not boiled and there is an associated reduction in system efficiency.

SUMMARY OF THE INVENTION

An object of the invention is to provide an efficient system for removing energy from elevated temperature fluid and in particular from geothermal brine and to transfer such energy to a working fluid through a direct-contact, single or binary-fluid heat exchanger.

Another object of the present invention is to remove noncondensable gases from the geothermal brine preparatory to introducing the brine into a direct-contact, single or binary-fluid heat exchanger in order to increase the efficiency of heat transfer in the heat exchanger.

Still another object of the invention is to reduce the temperature and pressure losses associated with the removal of noncondensable gases from the geothermal brine.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the degaser of the invention for use with a direct-contact, binary-fluid heat exchanger for transfering energy from an elevated temperature fluid, containing noncondensable gases, to a working fluid, may comprise means for flashing into a gaseous state at least some of the elevated temperature fluid, means for condensing the flashed elevated temperature fluid, means for subcooling the noncondensable gases, means for venting the noncondensable gases, and means for introducing the elevated temperature fluid into the heat exchanger to transfer energy to said working fluid.

Preferably, the condensate or distillate from the condenser in the flash degaser is allowed to drip back into the mainstream of geothermal brine so as to reduce heat loss which would occur if the distillate were separately disposed of.

Preferably, the degaser is multi-stage.

In a further aspect of the present invention, in accordance with its objects and purposes, a method for removing noncondensable gases from the geothermal brine preparatory to introducing said brine into the heat exchange includes the steps of flashing into a gaseous state in a flash degaser at least some of the elevated temperature fluid, condensing the flashed elevated temperature fluid in the flash degaser, subcooling the noncondensable gases, venting the noncondensable gases, and introducing the elevated temperature fluid into the heat exchanger to transfer energy to a working fluid.

The present invention solves the problems associated with prior art devices in that it efficiently removes noncondensable gases from the geothermal brine preparatory to introducing the brine into the heat exchanger without losses of thermal energy and without the pressure drops characteristic of the prior art. Unlike the prior art, the noncondensable gases are efficiently subcooled preparatory to venting same, and the working fluid is efficiently boiled in the degaser due in part to the removal of the back pressure regulation of the prior art and the inclusion of the subcooler in the degaser. Additionally the condensate or distillate from the condenser of the degaser is allowed to drip back into the stream of geothermal brine so that heat is not wasted as in prior systems. Still further, the simplicity of the degaser adds to its efficiency in comparison to prior art devices.

BRIEF DESCRIPTION OF THE DRAWINGS

The accompanying drawings, which are incorporated in and form a part of this specification illustrate two embodiments of the present invention and together with the description serve to explain the principles of the invention. In the drawings.

DETAILED DESCRIPTION OF THE INVENTION

Reference will not be made in detail to the present preferred embodiments of the invention, examples of which are illustrated in the accompanying drawings.

Figure 1:
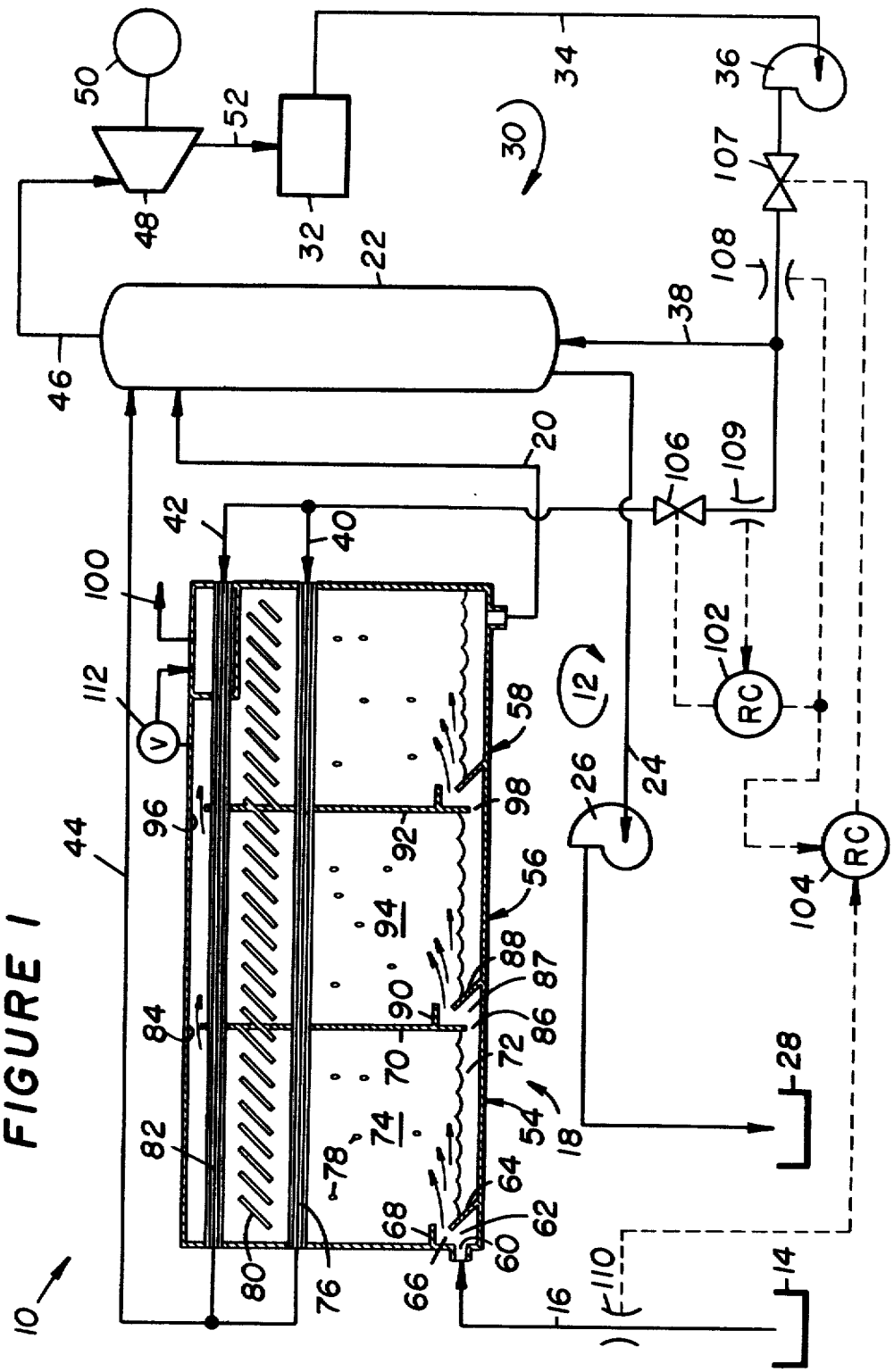
FIG. 1 is a schematic view of an energy conversion system with a direct-contact, binary-fluid heat exchanger and including an embodiment of the degaser of the invention enlarged and sectioned.

In FIG. 1, the energy conversion system is generally denoted by the numeral 10. System 10 includes a first loop 12 for, in a preferred embodiment, channeling the geothermal brine. First loop 12 includes well 14 which is the source of geothermal brine and conduit 16 which delivers the geothermal brine from well 14 to a multistage flash degaser 18 of the invention which can remove noncondensable gases such as, for example, carbon dioxide, methane, nitrogen and hydrogen sulfide, which are dissolved in the brine. It has been found that carbon dioxide can comprise upwards of 87% of the noncondensable gases dissolved in the geothermal brine.

From the degaser 18, the geothermal brine is directed through conduit 20 to a direct-contact, binary-fluid heat exchanger 22. From the heat exchanger 22, the brine is directed through conduit 24 and pump 26 to a reinjection station 28 for reinjection into the ground to prevent subsidence of the ground.

The system 10 includes a second loop 30 for conducting the working fluid to which energy is transferred from the geothermal brine. In a preferred embodiment the working fluid comprises isobutane; however, other hydrocarbons such as for example, methane, ethane, propane, n-butane, n-pentane, isopentane, and neopentane, and analogous olefins and mixtures thereof, which are immiscible with the geothermal brine may be used. Loop 30 includes a condenser and reservoir 32 for the isobutane and a conduit 34 which directs the condensed isobutane to a pump 36. From pump 36 the isobutane is introduced into the heat exchanger 22 by conduit 38 and into degaser 18 by conduit 40 which branches from conduit 38 and by conduit 42 which branches from conduit 40. From the degaser 18, vaporized isobutane is directed through conduit 44 to the heat exchanger 22. From heat exchanger 22, vaporized isobutane is directed through conduit 46 to turbine 48 where the vaporized isobutane expands, doing work to drive generator 50. From turbine 48, the spent isobutane is delivered through conduit 52 to condenser and reservoir 32.

It is to be understood that in the direct-contact, binary-fluid heat exchanger 22, the geothermal brine and isobutane are brought into direct contact causing the isobutane to flash into vapor and be removed through conduit 46. The geothermal brine being heavier than the isobutane and immiscible therewith, gravitates to and is removed from heat exchanger 22 through conduit 24. Sufficient means, including stainless steel demisters, are provided in heat exchanger 22 to remove any water mist from the vaporized isobutane preparatory to the removal of the vaporized isobutane through conduit 46 to turbine 48.

The multi-stage flash degaser 18, of the invention includes first stage 54, second stage 56, and third stage 58. First stage 54 includes an adjustable underflow weir which is located at 60 and which can be used to control the flow of geothermal brine into degaser 18. The brine enters a venturi 62 which is created by slanted baffle plate 64. At the "vena contracta", the smallest opening of the venturi, located at 66, the brine flashes and impinges on horizontal splash plate 58 and produces a thin horizontal sheet of brine, which has been found to move at speeds of up to 30 feet per second and impinge on the far wall 70 of the first stage 54. The brine collects in a pool 72 which is located at the base of first stage 54.

The steam resulting from the flashing of the brine rises through the above sheet of brine into the flash chamber 74 of the first stage 54. In doing so, the vapor is scrubbed of corrosive brine mist.

A condenser 76, comprising a plurality of parallel conduits provided through first, second and third stages 50, 56, 58, is located above flash chamber 74. Isobutane is provided to condenser 76 by conduit 40. The isobutane condenses the brine vapor and the distillate or condensate 78 falls back into brine pool 72. As the distillate 78 is recombined with the stream of geothermal brine in pool 72, there is no heat loss as there is associated with the prior art devices, wherein the distillate is disposed of instead of being so returned.

Owing to the above sheet of brine which scrubs the brine vapor of brine mist, the need for a demister pad comprising stainless steel mesh, for example, located between the flash chamber 74 and the condenser 76 for preventing corrosive brine mist from contacting the condenser is minimized. Thus in the preferred embodiment of FIG. 1, demister pads have been eliminated.

Located immediately above the condenser 76 is a plurality of slanted plate baffles 80 which extend through stages 54, 56 and 58 and which allow the noncondensable gases to pass upwardly therethrough while catching and condensing any brine vapor which has moved upwardly past the condenser 76.

Located immediately above the baffles 80 is subcooler 82 which includes a plurality of horizontal and parallel conduits that extend through stages 54, 56, and 58 and receive isobutane from conduit 42. Subcooler 82 slightly further cools the noncondensable gases and extracts heat therefrom. The isobutane in condenser 76 and subcooler 82 are vaporized by the heat exchange in first stage 54 and conducted through conduit 44 into heat exchanger 22 where it is mixed with the mainstream of vaporized isobutane thereof and then directed to turbine 48 through conduit 46. The subcooled, noncondensable gases exits first stage 54 through aperture 84 at the upper end thereof and proceeds to second stage 56. The pressure drop across this aperture is the same as that across the venturi 87 of the wall 70. The pool of brine 72 exits the first stage 54 though a weir 86 at the lower end thereof and enters venturi 87 which is defined by slanted baffle plate 88 of second stage 56. As in first stage 54, the brine flashes against horizontal flash plate 90 and a thin horizontal sheet of brine is directed toward and impinges upon the far wall 92 of the second stage 56.

Second stage 56 includes a flash chamber 94 and as indicated above condenser 76, baffles 80 and subcooler 82 extend therethrough. As with first stage 54, carbon dioxide and other noncondensable gases exit second stage 56 through an aperture 96 located at the upper end of wall 92 thereof and the brine exits through a weir 98 located at the lower end of wall 92. Again, both streams undergo the same pressure drop. The noncondensable gases and geothermal brine then enter third stage 56 where similar flashing and condensing occurs. The noncondensable gases from third stage 58 are drastically subcooled as they enter an internal vent condenser or subcooler 101 through back-pressure regulating valve 112 and then exit through conduit 100 at the upper end thereof. Valve 112 can be automatically or hand operated and regulates the amount of noncondensable gases entering conduit 100 in order to regulate the back pressure in degaser 18 to control the saturation pressure and temperature therein. The geothermal brine thus freed of dissolved noncondensable gases leaves third stage 58 through conduit 20 and enters the direct-contact, binary-fluid heat exchanger 22 where it vaporizes the isobutane as outlined hereinabove.

In order to balance system 10, ratio controllers 102 and 104, which are responsive to pressure and temperature transducers (not shown) and are interconnected, are incorporated therein. Ratio controller 102 is additionally responsive to the rate of flow of isobutane through orifice or sensors 108 and 109 located on conduits 38 and 40, respectively, for controlling the flow of isobutane through conduits 40 and 42. Accordingly, there can be more or less cooling in degaser 18 depending on the temperature and pressure of the isobutane and the flow rate at sensor 108. The flow of isobutane from pump 36 is regulated by ratio controller 104 which is additionally responsive to the flow rate of brine through orifice or sensor 110 on conduit 16.

The operation of the system 10 and in particular the degaser 18 is as follows. During the flashing process in first, second, and third stages 54, 56, and 58, calculations indicate that the brine will cool 5° F. for a 1.7° F. flash down per stage with 96.1% of the noncondensable gases (presuming they are mainly carbon dioxide) being removed by degaser 18.

The removal of the noncondensable gases from the brine helps reduce inefficient frothing in heat exchanger 22 and reduces the need for expensive water type scrubbers at the top of the heat exchanger 22.

It should be understood that in the system 10 example it is contemplated that the mass flow of geothermal brine is approximately equal to the mass flow of isobutane. Approximately 3% of the isobutane which is pumped through conduit 38 is diverted to conduits 40 and 42 and into degaser 18 to condense the brine vapor and subcool the noncondensable gases.

A calculated example of the operating conditions for system 10 is as follows. With the degaser 18 receiving approximately 91,000 pounds per hour of geothermal brine containing 365 PPM of free, dissolved carbon dioxide and other noncondensable gases, all at 340° F. and 9.3 atmospheres, brine exits the degaser 18 at 335° F., 7.6 atmospheres with 14.5 PPM of free carbon dioxide and other noncondensable gases. Approximately 2,600 pounds per hour of isobutane or approximately three percent by weight of the total amount of isobutane in system 10 travels through condenser 76 and subcooler 82 which for purposes of these calculations comprise titanium tubes. The isobutane enters at a temperature of approximately 101° F. and leaves as a vapor at 260° F. and 458 psia. The noncondensable gases, saturated with water vapor, exit the degaser 18 at approximately 120° F. and 60 psia. Further, it is calculated that 61% of the noncondensable gases originally dissolved in the geothermal brine are removed by the degaser 18 in the first stage 54, that 84.8% of the originally dissolved noncondensable gases are removed from the brine by the time the brine exits the second stage 56 of the degaser 18, and that 96.1% of the noncondensable gases originally dissolved in in the geothermal brine are removed from the brine by the time the brine exits the third stage 58 of the degaser 18.

The stability of the degaser 18 is due to back pressure condensing which is controlled by valve 112 in the degaser 18, whereby a metered amount of isobutane is vaporized by condensing a corresponding amount of steam. This condensation, in turn, fixes the condensing temperature and the partial pressure of steam in each chamber at the desired saturation values. Increasing the amounts of isobutane and brine flow proportionally will increase the condensation of steam proportionally and will hold the flashdown temperature constant so that by ratio control, through controllers 102 and 104, of the mass flows of isobutane in the system, stability is insured.

Thus, it can be seen that the above invention has several advantages over the prior art in that degaser 18 efficiently removes noncondensable gases from the geothermal brine thus allowing efficient heat transfer from the brine to the isobutane in heat exchanger 22, in that degaser 18 includes a subcooling section to extract additional energy from the noncondensable gases before they are vented while efficiently vaporizing the isobutane therein, and in that degaser 18 allows the distillate or condensate to drop back into the pool of geothermal brine so that there is no heat loss by disposal of the distillate separately from the system.

Figure 2:
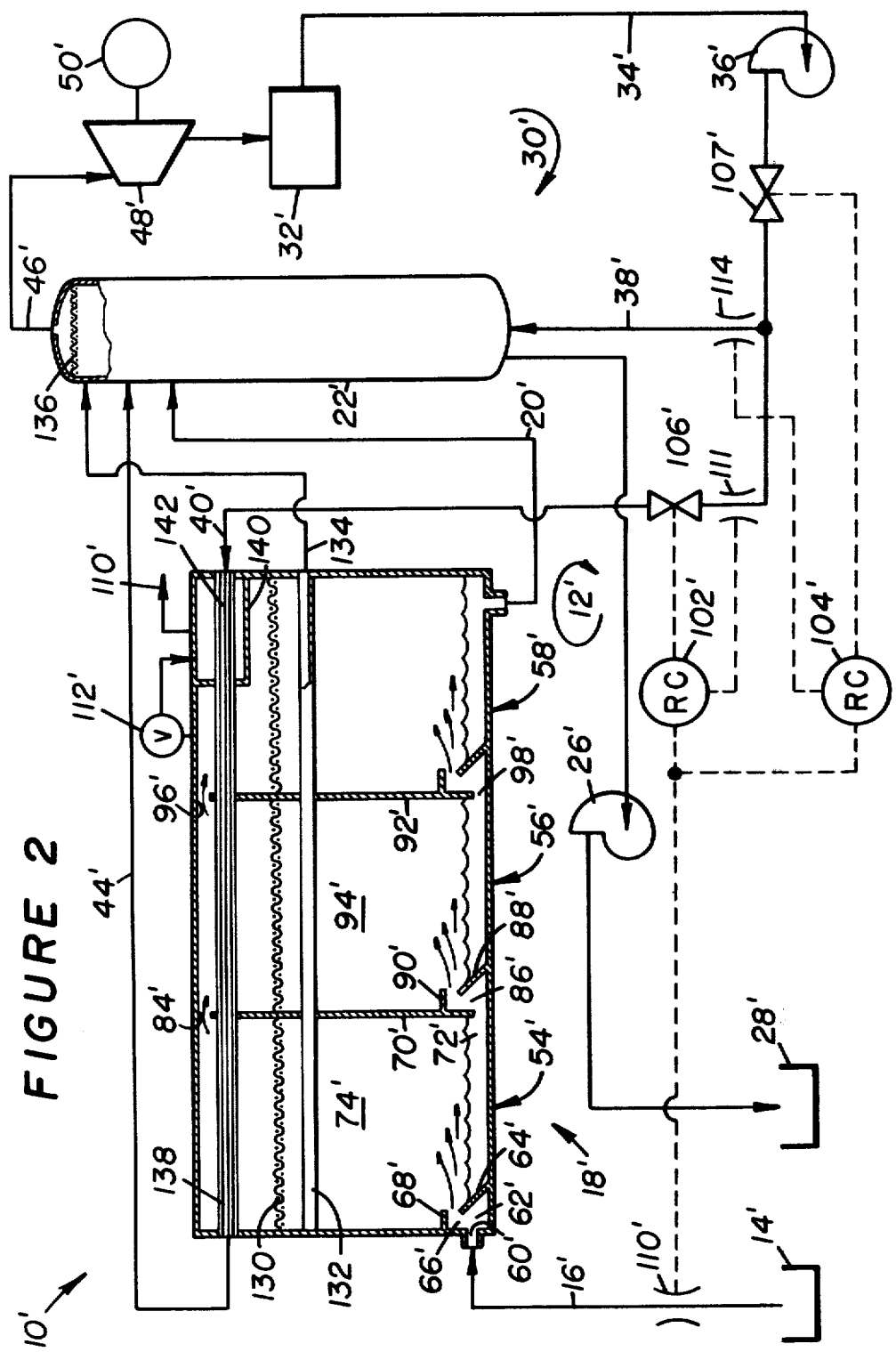
FIG. 2 is a schematic view of an energy conversion system with a direct-contact, binary-fluid heat exchanger and with an alternative embodiment of the degaser of the invention shown enlarged and sectioned.

An alternate embodiment of the invention is depicted in FIG. 2. Elements of the embodiment in FIG. 2 which are similar to those of the embodiment in FIG. 1 are designated with a like numeral which has been primed.

In the degaser 18' is a stainless steel mesh demister 130 positioned to one side of the trough 132 at the upper end of each stage 54', 56', and 58'. Demister 130 coalesces the brine entrainment and removes it from the geothermal brine vapor before the latter rises into the condenser 138 to condense thereon, with the condensate or distillate falling into trough 132 by which it is removed from the degaser 18'. From trough 132, the distillate passes through conduit 134 and is introduced into a demister and scrubber 136 located at the upper end of the heat exchanger 22. The demister and scrubber 136 demists and scrubs the vaporized isobutane as it exits heat exchanger 22' on its way to turbine 48'. Located immediately above condensate trough 132 in degaser 18' is condenser 138 which like trough 132 spans all three stages 54', 56', and 58'. Condenser 138 is comprised of a bundle of parallel conduits in a manner similar to condenser 78 of the first embodiment (FIG. 1).

In third stage 58' a proportion of condenser 138 is separated from the rest of a third stage 58 by a baffle 140 so as to define a subcooler portion 142 of condenser 138. The noncondensable gas enters subcooler 142 through the back-pressure regulating valve 112. Subcooler 142 subcools the noncondensable gases preparatory to their being released from degaser 18' through conduit 110'. Ratio controllers 102' and 104' set the amount of isobutane flowing to valve 107' and valve 106' in proportion to the rate of flow of geothermal brine through sensor 110' and to the temperature and pressure of the geothermal brine and isobutane of the system by means of the previously indicated transducers. This represents an alternative to the embodiment of FIG. 1 for balancing the system.

Except as indicated above, the operation of system 10' is similar to that of system 10.

The foregoing description of the preferred embodiments of the invention has been presented for purposes of illustration and description. It is not intended to be exhaustive or to limit the invention to be precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suitable to the particular use contemplated. It is intended that the scope of the invention be defined by the claims appended hereto.

I claim:

1. In an energy conversion system having a direct-contact heat exchanger for transfering energy from an elevated temperature fluid, containing noncondensable gases to a working fluid, the improvement comprising means for removing the noncondensable gases from the elevated temperature fluid ahead of the heat exchanger including a flash degaser having;
    means for flashing into a gaseous state at least some of the elevated temperature fluid;
    means for condensing the gaseous state of the elevated temperature fluid;
    means for subcooling the noncondensable gases;
    means for venting said noncondensable gases;
    means for introducing the elevated temperature fluid into the heat exchanger to transfer energy to said working fluid;
    said working fluid being boiled to vapor in said flash degaser; and
    means for introducing said vaporized working fluid into said heat exchanger.

2. The apparatus of claim 1 wherein said condensing means includes means for directing some of said working fluid from said heat exchanger to said flash degaser.

3. The apparatus of claim 1 including means for metering a desired amount of working fluid to said flash dagaser.

4. The apparatus of claim 1 wherein said venting means including a control valve means for maintaining the back pressure in said flash degaser.

5. The apparatus of claim 4 wherein said degaser is multi-stage and said venting means communicate with a last stage of said degaser.

6. The apparatus of claim 1 including baffle means for separating said condenser means from said subcooling means.

7. The apparatus of claim 1 wherein said elevated temperature fluid includes brine and said working fluid is immiscible therewith.

8. The apparatus of claim 1 including means for collecting distillate from said condensing means.

9. The apparatus of claim 8 including a scrubber located in said heat exchanger and means for introducing said distillate into said scrubber.

10. The apparatus of claim 1 wherein said flash degaser is multi-stage.

11. The apparatus of claim 9 wherein at least one stage includes subcooling means.

12. The apparatus of claim 9 wherein each stage includes said subcooling means.

13. The apparatus of claim 1 including ratio control means responsive to the condition of working fluid flowing to the heat exchanger for modulating the flow of working fluid to the condensing means.

14. The apparatus of claim 1 including ratio control means responsive to the condition of the elevated temperature fluid entering the flash degaser for modulating the flow of working fluid to the condensing means.

15. In an energy conversion system including a heat exchanger for transferring energy from an elevated temperature fluid, containing noncondensable gases, to a working fluid, the improvement comprising flash degaser means for removing the noncondensable gases from the elevated temperature fluid ahead of the heat exchanger including:
    means for flashing the elevated temperature fluid;
    means for condensing the flashed elevated temperature fluid;
    means for subcooling the noncondensable gases;
    means for venting the noncondensable gases;
    means for introducing the elevated temperature fluid into the heat exchanger to transfer energy to said working fluid;
    said working fluid being boiled to vapor in said flash degaser; and
    means for introducing said vaporized working fluid into said heat exchanger.

16. The apparatus of claim 15 wherein said heat exchanger is a flash tank.

17. A method for removing noncondensable gases from an elevated temperature fluid preparatory to introducing the elevated temperature fluid into a direct-contact heat exchanger for transfering energy from the elevated temperature fluid to a working fluid including the steps of:
    flashing into a gaseous state in a flash degaser at least some of the elevated temperature fluid;
    condensing the flashed elevated temperature fluid in the flash degaser;
    subcooling the noncondensable gases;
    venting the noncondensable gases;
    introducing the elevated temperature fluid into heat exchanger to transfer energy to said working fluid;
    boiling said working fluid to vapor in the flash degaser; and
    introducing the vaporized working fluid into said heat exchanger.

18. The method of claim 17 wherein the condensing step include the step of diverting some of the working fluid from the heat exchanger to the flash degaser to condense the flashed elevated temperature fluid.

19. The method of claim 17 wherein said direct-contact heat exchanger includes a flash tank, including the step of introducing the elevated temperature fluid into the flash tank.

20. The method of claim 17 including the step of regulating the flow of working fluid to said flash degaser.

21. The method of claim 17 including the steps of maintaining the back pressure in said flash degaser.

22. The method of claim 17 including the step of collecting distillate from said condensing step.

23. The method of claim 17 wherein said flashing step includes flashing the elevated temperature fluid in a multi-flash degaser.

24. The method of claim 18 including the step of:
    modulating the flow of working fluid to the flash degaser responsive to the condition of the working fluid flowing to the heat exchanger.

25. The method of claim 18 including the step of:
    modulating the flow of working fluid to the flash degaser responsive to the condition of the elevated temperature fluid entering the flash degaser.

* * * * *